Nov. 20, 1962
D. MOHLER ET AL
3,065,389
ELECTROLYTIC CAPACITOR AND ELECTROLYTE THEREFOR
Filed Nov. 23, 1959
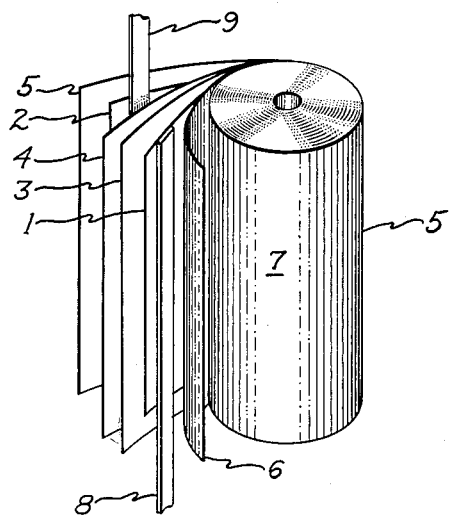
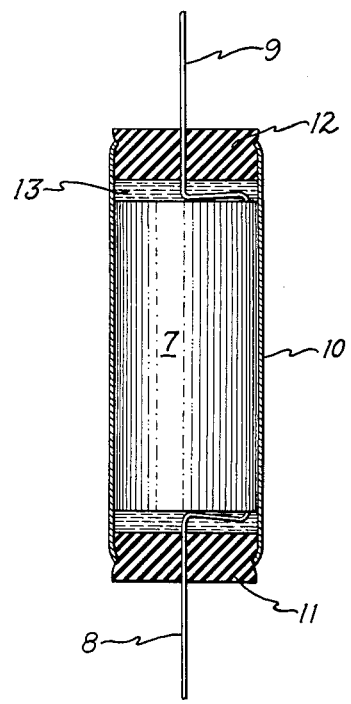
Inventors,
Donald Mohler,
James R. Ritter,
by Sidney Greenberg
Their Attorney.

3,065,389
ELECTROLYTIC CAPACITOR AND
ELECTROLYTE THEREFOR
Donald Mohler, Saratoga Spa., and James R. Ritter, South Glens Falls, N.Y., assignors to General Electric Company, a corporation of New York
Filed Nov. 23, 1959, Ser. No. 854,698
4 Claims. (Cl. 317—230)

The present invention relates to electrolytic capacitors, and more particularly to an improved fill electrolyte therefor.

It is an object of the present invention to provide a capacitor having a high degree of stability and improved life characteristics when operated at high voltages and over a wide range of temperature.

It is a specific object of the invention to provide an electrolytic capacitor which is operable over a temperature range of about −55° C. to 125° C., and having minimum change in capacitance over that range as well as low electrical losses.

It is a further object of the invention to provide a non-aqueous fill electrolyte which confers the above improved characteristics on electrolytic capacitors and which has good solvent characteristics allowing desired control over the resistivity properties of the electrolyte.

In accordance with the present invention, the above objects and others which will become apparent hereinafter, are achieved in an electrolytic capacitor which comprises an electrode of a film-forming metal and an electrolyte consisting essentially of a liquid organic carbonate of the type more fully described hereinafter. Preferably, the liquid organic carbonate is composed of propylene carbonate, which provides exceptionally good results in terms of maintaining satisfactory liquid and resistivity properties of the electroltye over a wide temperature range.

The invention will be better understood from the following description taken in conjunction with the accompanying drawing in which:

FIGURE 1 shows an electrolytic capacitor assembly of the rolled type in which the invention may be embodied; and, FIGURE 2 shows the capacitor assembly of FIGURE 1 arranged in a case.

Referring now to the drawing, and in particular to FIGURE 1, there is shown a partially unrolled capacitor roll body comprised of a pair of electrode foils 1 and 2, at least one of which is made of tantalum or other suitable film-forming metal, and has a dielectric oxide film thereon produced, for example, by anodizing, the foils in the operation of the capacitor having opposite polarity. Between foils 1 and 2 are sheets of dielectric spacer material 3, 4, 5 and 6, composed conventionally of kraft paper or other suitable material of a porous impregnable nature. Terminals or tap straps 8 and 9 are secured to the respective foils and extend in opposite directions. Electrode foils and dielectrode sheets are wound into a compact roll 7 prior to insertion into a casing, as shown in FIG. 2.

FIGURE 2 shows the capacitor roll assembly 7 enclosed in a metal casing 10 with terminals 8 and 9 extending respectively through plugs or discs 11, 12 of insulating material, such as a synthetic resin, providing a fluid-tight seal for the interior of the casing. Electrolyte 13 containing a suitable ionogen in a liquid organic carbonate in accordance with the present invention, as more particularly described hereinafter, fills casing 10 and impregnates the porous spacer material.

While a rolled foil type of electrolytic capacitor is shown, it will be understood that other types of electrolytic capacitors employing liquid electrolytes, such as slug or wire types of capacitors, may embody the present invention for obtaining similar benefits.

In its preferred form, the electrolyte of the present invention consists principally of propylene carbonate and a suitable ionogen dissolved therein to provide for the necessary conductivity in the electrolyte. Generally, the ionogen will be present in small amounts, and ordinarily an amount of the ionogen is used which will not precipitate at −55° C. Within such limitation, higher concentrations of ionogen may be used for low voltage applications, whereas lower concentrations of ionogen may be used for higher voltage applications. In general, depending largely on the voltage conditions to which the capacitor will be subjected, the ionogen will be present in the propylene carbonate in an amount of about .01% by weight to a maximum constituted by a sufficient amount of ionogen to saturate the solvent at 20° C. Ordinarily the latter amount will be of the order of 5% by weight.

A preferred ionogen for the present electrolyte is potassium thiocyanate. The invention, however, is not restricted to this particular ionogen and other salts may be employed including alkaline borates, and the alkali phosphates, oxalates, citrates, tartrates, succinates, nitrates, chlorides, chromates, and acetates having good solubility characteristics in the liquid organic carbonate solvent used for the electrolyte.

Listed below in Table I are examples of salts used as ionogens dissolved in propylene carbonate electrolyte solutions and having in such solution the resistivities shown at 20° C. Saturated solutions of these materials were prepared by adding 10 grams of the salt to 50 cc. of the propylene carbonate solvent, and in all cases some of the salt remained undissolved.

Table I

| Salt in saturated propylene carbonate solution: | Solution resistivity (20° C.) (ohm-cm.) |
|---|---|
| Lithium chloride | 4,000 |
| Lithium nitrate | 900 |
| Sodium nitrate | 5,500 |
| Ammonium nitrate | 2,400 |
| Nickel nitrate | 1,300 |
| Manganous nitrate (50% aqueous sol.) | 570 |
| Cobalt nitrate | 650 |
| Ammonium thiocyanate | 180 |

As shown, all these solutions were characterized by remarkably low resistivities, and they are adapted for use as electrolytic capacitor electrolytes over wide temperature and voltage ranges.

Illustrative examples of other salts which may be used as ionogens in the present electrolyte are ammonium pentaborate, ammonium oxalate, sodium oxalate, potassium citrate, potassium tartrate, potassium succinate, cobalt chloride, and nickel chloride.

The following table shows, by way of example, the degree of solubility of some of the above-mentioned salts in propylene carbonate at 40° C.

Table II

| Salts: | Grams solute in 100 gm. propylene carbonate |
|---|---|
| $CoCl_2.6H_2O$ | 3.0 |
| $Co(NO_3)_2.6H_2O$ | 25.4 |
| $NiCl_2.6H_2O$ | 0.4 |
| $Ni(NO_3)_2.6H_2O$ | 5.8 |

Propylene carbonate has been found to exhibit an extremely desirable combination of properties which imparts a number of benefits to the electrolytic capacitors in which it is incorporated. A particularly significant feature of the propylene carbonate is its very high dielectric constant of about 61.7 at 40° C. and its corresponding high solvent power for many ionogenic materials. By virtue of this solvent power, it permits a high degree of control of the resistivity characteristics of the electrolyte solution to adapt it for high or low voltage conditions. By way of example, a solution of propylene carbonate and potassium thiocyanate containing less than 1% of potassium thiocyanate has a resistivity of approximately 800 ohm-centimeters at 25° C. and 16,000 ohm-centimeters at −55° C. The pour point of propylene carbonate is extremely low, −80° C., due to its ease of super cooling, and it has a boiling point of 242° C. as compared to the 153° C. of dimethyl formamide, a previously favored ionogen solvent. Another significant feature of the propylene carbonate is its extremely low vapor pressure of .03 milimeter at 20° C. as compared to the 2.8 millimeters of dimethyl formamide, thus making the propylene carbonate much more desirable from the standpoint of avoiding difficulties in loss of the electrolyte through evaporation.

In a life test carried out on electrolytic capacitors incorporating propylene carbonate as the electrolyte solvent, the results shown in Table III below were obtained. The capacitors tested were constructed of tantalum foil anodes and cathodes with Dexter paper spacer sheets therebetween, the electrolyte being composed of propylene carbonate and a sufficient amount of potassium thiocyanate to produce a resistivity of about 720 ohm-centimeters at 25° C. The test capacitors were subjected to conditions of 200 volts D.C. at 85° C.

Table III

| Hours on Test | Temp. | 120 c.p.s. | | 1,000 c.p.s. | | Leakage ($\mu$a.) (200 v./10 minutes |
|---|---|---|---|---|---|---|
| | | Cap. | Percent D | Cap. | Percent D | |
| 0 | 25 | 1.47 | 1.2 | 1.44 | 3.0 | 29 |
| | −55 | 1.36 | 3.5 | 1.31 | 10.3 | 2.8 |
| 144 | 25 | 1.40 | 2.0 | 1.35 | 5.0 | 4.0 |
| 504 | 25 | 1.38 | 3.0 | 1.31 | 7.0 | 7.5 |
| 1,008 | 25 | 1.41 | 4.8 | 1.32 | 11.5 | 4.5 |

In the above table c.p.s. represents cycles per second, and percent D is percent dissipation factor (corresponding generally to power factor). As will be seen from the table, the percent capacitance retained at −55° C. is extremely high at both 120 and 1000 cycles per second, this value being over 90%. The dissipation factor value is also quite satisfactory both at the low temperature of −55° C. and at normal temperatures at the end of over 1000 hours of test under the severe life test conditions. Also noteworthy is the excellent leakage current properties exhibited by the capacitors, especially in view of the marked reduction in this value over the period of the life test. All these data are good indications of the excellent stability of the propylene carbonate electrolyte composition of the present invention.

While the propylene carbonate solvent described above has been found particularly suitable for the purpose of the invention, other organic carbonate compounds having a dielectric constant of over 15 are contemplated for use within the scope of the invention. For example, ethylene carbonate with a dielectric constant of 89.6 at 40° C. has many characteristics similar to those of propylene carbonate, including a high boiling point and low vapor pressure which are close to those of propylene carbonate. While the pour point of this material is much higher than propylene carbonate, mixtures of ethylene carbonate and propylene carbonate of suitable proportions may be used for the desired purpose.

For example, a mixture of 10% ethylene carbonate and 90% of propylene carbonate (by weight) has a freezing point of about −55° C., and a mixture of equal parts has a freezing point of about 0° C., the actual freezing point being somewhat lower in the presence of an ionogen. In addition, acyclic organic carbonate compounds, namely, bis(2-methoxyethyl)carbonate which has a pour point of −60° C. and a boiling point of 225° C., and bis(2-chloroethyl) carbonate also having a pour point of −60° C. and a boiling point of about 218° C. are both characterized by appropriate liquid properties, dielectric constant and other electrical properties to provide satisfactory results in accordance with the invention.

The following table shows examples of such alternative types of liquid organic carbonate electrolyte solutions and their resistivity characteristics:

Table IV

| Electrolyte composition: | Resistivity, ohm-cm., 25° C. |
|---|---|
| Bis(2-methoxyethyl) carbonate, saturated with $NH_4SCN$ at 25° C. | 400 |
| 90% propylene carbonate—10% ethylene carbonate, saturated with $Co(NO_3)_2 \cdot 6H_2O$ | 700 |
| Bis(2-methoxyethyl) carbonate saturated with $Co(NO_3)_2 \cdot 6H_2O$ at 25° C. | 1500 |

The low resistivities manifested by these solutions also make them well adapted for use as capacitor electrolytes in accordance with the invention.

The capacitor electrolyte of the present invention provides a unique combination of desirable properties which makes it eminently suitable for use under a wide range of temperature and voltage conditions and which overcomes a number of disadvantages of the prior art electrolyte solutions. In general, the high boiling point coupled with low freezing point and the high solvent power for the ionogen component make the present media particularly advantageous as electrolytic capacitor electrolytes. Being non-aqueous, the present electrolyte has lower vapor pressure than aqueous types of electrolytes and thereby presents a lesser problem in maintaining a tight seal around the capacitor. The especially low vapor pressure of the propylene carbonate materially contributes to overcoming this problem further. Moreover, the present electrolyte avoids the difficulties encountered in the use of known electrolytes containing mixed solvents having radically different boiling points and vapor pressures which may, by variable evaporation, change the chemical composition, viscosity, resistivity and freezing point of the electrolyte, and lead to wide changes in capacitance. The present electrolyte is exceptionally stable and resistant under severe conditions of heat, light and chemical change, is not corrosive to the metals usually employed as capacitor casings, and has no solvent action on the formed oxide films of the capacitor electrodes.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrolytic capacitor comprising a pair of electrodes at least one of which is composed of a film-forming metal having a dielectric film thereon and an electrolyte consisting essentially in percent by weight of about 0.01% to a saturating amount at 20° C. of potassium thiocyanate dissolved in a solvent selected from the group consisting of propylene carbonate, a mixture of propylene carbonate and ethylene carbonate, bis(2-methoxyethyl) carbonate, and bis(2-chloroethyl) carbonate.

2. An electrolytic capacitor comprising a pair of electrodes at least one of which is composed of a film-forming metal having a dielectric film thereon, and an electrolyte consisting essentially in percent by weight of .01% to a saturating amount at 20° C. of potassium thiocyanate dissolved in propylene carbonate.

3. A liquid electrolyte for electrolytic capacitors consisting essentially in percent by weight of .01% to a saturating amount at 20° C. of potassium thiocyanate dissolved in a solvent selected from the group consisting of propylene carbonate, a mixture of propylene carbonate and ethylene carbonate, bis(2-methoxyethyl) carbonate, and bis(2-chloroethyl) carbonate.

4. A liquid electrolyte for electrolytic capacitors consisting essentially of a solution of about .01–5% by weight of potassium thiocyanate dissolved in a solvent composed of propylene carbonate.

References Cited in the file of this patent

UNITED STATES PATENTS

| | | |
|---|---|---|
| 1,829,178 | Yngve | Oct. 27, 1931 |
| 1,907,891 | Steimmig | May 9, 1933 |
| 2,851,642 | Schaeren | Sept. 9, 1958 |
| 2,886,528 | Myers | May 12, 1959 |
| 2,894,957 | Anderson et al. | July 14, 1959 |
| 2,965,690 | Petersen et al. | Dec. 20, 1960 |
| 3,001,108 | Mohler et al. | Sept. 19, 1961 |

OTHER REFERENCES

"Ethylene Carbonate and Propylene Carbonate," Technical Information, pub. by Carbide and Carbon Chemicals, F-8307A. 7 pages, March 1957.

Drake et al.: "Some Representative Carbonates and Carboethoxy Derivatives Related to Ethylene Glycol," J. Am. Chem. Soc., vol. 52, September 1930, pp. 3720–3724.

Chemical Abstracts, vol. 24, 1930, pp. 62–63.